US009442954B2

(12) United States Patent
Guha et al.

(10) Patent No.: US 9,442,954 B2
(45) Date of Patent: Sep. 13, 2016

(54) METHOD AND APPARATUS FOR ACHIEVING OPTIMAL RESOURCE ALLOCATION DYNAMICALLY IN A DISTRIBUTED COMPUTING ENVIRONMENT

(71) Applicant: Datawise Systems, Palo Alto, CA (US)

(72) Inventors: Amitava Guha, San Jose, CA (US); Jeffrey Chou, Palo Alto, CA (US); Gopal Sharma, San Jose, CA (US)

(73) Assignee: Datawise Systems, Palo Alto, CA (US)

( * ) Notice: Subject to any disclaimer, the term of this patent is extended or adjusted under 35 U.S.C. 154(b) by 137 days.

(21) Appl. No.: 14/076,503

(22) Filed: Nov. 11, 2013

(65) Prior Publication Data

US 2014/0136779 A1   May 15, 2014

Related U.S. Application Data

(60) Provisional application No. 61/725,396, filed on Nov. 12, 2012.

(51) Int. Cl.
G06F 12/00 (2006.01)
G06F 13/00 (2006.01)
G06F 17/30 (2006.01)
G06F 9/50 (2006.01)
H04L 29/08 (2006.01)

(52) U.S. Cl.
CPC ....... *G06F 17/30194* (2013.01); *G06F 9/5066* (2013.01); *H04L 67/10* (2013.01)

(58) Field of Classification Search
None
See application file for complete search history.

(56) References Cited

U.S. PATENT DOCUMENTS

| 8,468,135 | B2* | 6/2013 | Constantinescu ... G06F 11/1453 707/640 |
| 8,543,596 | B1* | 9/2013 | Kostamaa et al. ............. 707/770 |
| 9,037,856 | B2* | 5/2015 | Bestler .................. H04L 9/0863 713/167 |
| 2006/0047855 | A1* | 3/2006 | Gurevich et al. ............. 709/247 |
| 2009/0254911 | A1* | 10/2009 | Okano ................ G06F 11/1474 718/102 |
| 2011/0161976 | A1* | 6/2011 | Alexander et al. ........... 718/104 |
| 2011/0258374 | A1* | 10/2011 | Pertocelli .............. G06F 3/0608 711/104 |
| 2013/0073825 | A1* | 3/2013 | Terayama et al. ............ 711/165 |
| 2013/0132967 | A1* | 5/2013 | Soundararajan et al. .... 718/104 |
| 2013/0185258 | A1* | 7/2013 | Bestler .............. G06F 17/30197 707/638 |
| 2013/0283058 | A1* | 10/2013 | Fiske .................... G06F 21/602 713/189 |

(Continued)

OTHER PUBLICATIONS

Workload Optimization through Dynamic Reconfiguration of Compute Nodes. IPCOM000215416D. Feb. 26, 2012. An IP.com Prior Art Database Technical Disclosure.*

*Primary Examiner* — Sean D Rossiter
(74) *Attorney, Agent, or Firm* — Imperium Patent Works; Zheng Jin

(57) ABSTRACT

A method for achieving optimal use of compute, storage and network resources in a distributed computing system is provided. In one embodiment, a job request associated with a file is submitted. A Job Scheduler in conjunction with a workflow manager determines the best fit for dynamically chunking size of the file. The distributed storage subsystem provides a dynamic view to the compute resources where the job will be run. This knowledge is also used to pre-staging the data by the distributed storage subsystem. Furthermore, keeping a history of the job and their data allows for further improvements in resources and job execution times by being able to skip processing on data that has been done previously. Given the ability to chunk the file dynamically, it is possible to re-balance resources for running the job dynamically to meet its service level agreement.

21 Claims, 9 Drawing Sheets

WORKLOAD MANAGER FLOW CHART

(56) References Cited

U.S. PATENT DOCUMENTS

| | | | |
|---|---|---|---|
| 2015/0213074 A1* | 7/2015 | Varakin | G06F 17/30445 707/741 |
| 2015/0234686 A1* | 8/2015 | Zhang | G06F 9/5083 718/105 |
| 2015/0304371 A1* | 10/2015 | Fujita | H04L 12/1822 709/204 |
| 2015/0363167 A1* | 12/2015 | Kaushik | G06F 7/24 707/753 |
| 2016/0026653 A1* | 1/2016 | Caro | G06F 17/30159 707/692 |

* cited by examiner

STORE, SPLIT, AND PRE-STAGE A FILE

WORKLOAD MANAGER FLOW CHART

DYNAMIC CHANGING RESOURCES WHILE JOB RUNNING

METHOD AND APPARATUS FOR ACHIEVING OPTIMAL RESOURCE ALLOCATION DYNAMICALLY IN A DISTRIBUTED COMPUTING ENVIRONMENT

CROSS REFERENCE TO RELATED APPLICATIONS

This application claims priority under 35 U.S.C. §119 from U.S. Provisional Application No. 61/725,396, entitled "Method and Apparatus for Achieving Optimal Compute, Storage, and Network Resource Allocation Dynamically in a Distributed Computing Environment," filed on Nov. 12, 2012, the subject matter of which is incorporated herein by reference.

TECHNICAL FIELD

The disclosed embodiments relate to distributed computing environments where processing on a data file(s) is done on a regular basis. Moreover, multiple processing jobs may require processing of the same file(s). Example of such a distributed computing environment is a Hadoop cluster, running jobs via the MapReduce framework. In multi-tenant environments, jobs need to meet their Service Level Agreements (SLA).

BACKGROUND

Big data analytics environments like Hadoop are employed in environments where the data is constantly growing and changing. For example, Apache Hadoop is an open-source software framework for storing and large scale processing of data sets on clusters of commodity hardware. Hadoop consists of the Hadoop Common package that provides file system and OS level abstractions, a MapReduce engine, and the Hadoop Distributed File System (HDFS). For effective scheduling of work, every Hadoop-compatible file system should provide location awareness. Hadoop applications can use this information to run work on the compute node where the data is to reduce backbone traffic. HDFS uses this method when replicating data to try to keep different copies of the data on different nodes. In multi-tenant environments, as the number of nodes and or users in the cluster increase, it becomes increasingly difficult to achieve this data locality.

Broadly speaking, the MapReduce programming model is divided into 3 distinct steps: a Map, a Shuffle, and a Reduce phase. Usually a distributed file system like HDFS is employed in conjunction with the MapReduce framework in which data is read from the HDFS during the Map phase, and results written to HDFS during the tail end of the Reduce Phase. The data during the Shuffle phase is usually termed intermediate data and is usually housed in local file systems on the nodes of the Hadoop cluster. HDFS splits a file into pre-configured fixed sized chunks (usually 64 MB or 128 MB), and these chunks are distributed across the nodes of the cluster in a uniform fashion. Usually three copies are made to achieve high availability. In certain cases, more copies are made in order to achieve high data locality while scheduling jobs.

Several techniques have been suggested for improving data locality in big data analytics environments. They range from "delay scheduling" to increasing number of replicas (copies) in order to achieve the same. "Delay Scheduling" suggests waiting for a previous running job to finish rather than schedule the new job in a node that is currently available, but does not have the data. This wastes processing cycles. Increasing number of replicas is yet another technique; however, it comes at a cost of increased storage.

Fixed large sized chunking also leads to the fact that even if more compute resources are available, they cannot be used to speedup jobs. As an extreme example, consider a file with one chunk of size 128 MB. Since this file is replicated three times, it can lie in a maximum of three compute nodes. The three copies allow for flexibility in choosing amongst the three nodes available to schedule. However, the maximum number of compute resources it can use is only one compute node even if the cluster is comprised of many more nodes.

FIG. 1 (prior art) illustrates a typical Hadoop cluster environment 100 with HDFS fixed sized chunking. Hadoop cluster environment 100 comprises a network switch/fabric 110, a first client terminal 101, a second client terminal 102, a master device 120, and a plurality of slave devices 121-123. The master device 120 comprises a control node 130 and a name node 140. Each slave device 121-123 comprises a compute node 131-133 and a data node 141-143 respectively. All the nodes are connected via an Ethernet network by the network switch/fabric 110. From system architecture point of view, control node 130 and compute nodes 131-133 form a map reduce layer, while name node 140 and data nodes form a HDFS layer. On the control node, the job tracker is responsible for scheduling and monitoring jobs via the scheduler. The name node presents the interface to the client terminals for writing and reading data to/from the HDFS layer as well as submitting jobs. The compute nodes provide the computing resources for executing jobs, and the data nodes provide the storage space for storing files and data. As explained earlier, HDFS splits a file into pre-configured fixed sized chunks (e.g., 128 MB), and these chunks are distributed across the three data nodes in a uniform fashion. For example, file F1 consists of three chunks {1, 2, 3}, and file F2 consists of two chunks {4, 5}. Note that in this particular example, the chunks do not have three copies as to keep the example simpler.

FIG. 1 also illustrates the logical flow when jobs are submitted. Client terminal 101 has submitted JOB1 associated with an input file F1, whereas client terminal 102 has submitted JOB2 associated with an input file F2. The job tracker accepts the jobs and schedules the jobs to be run by different tasks on the compute nodes. The tasks work in conjunction with the job tracker, reporting task status as well as starting new tasks. The scheduler in conjunction with the job tracker tries to schedule tasks on computed nodes where the data lies. In the example of FIG. 1, data node 141 stores chunks 1, 3, and 4, data node 142 stores chunks 2, 5, and 1, and data node 143 stores chunks 3, 4, and 5. As a result, JOB1 has three tasks 1A, 1B and 1C, task 1A and task 1B are scheduled on compute node 131, and task 1C is scheduled on compute node 132. Similarly, JOB2 has two tasks 2A and 2B, task 2A is scheduled on compute node 132, and task 2B is scheduled on compute node 133. However, if more compute nodes are available, they cannot be used to speed up the jobs. The number of nodes can be used for a job/file is limited to the number of chunks the file has.

Therefore, there exists a need for a method and apparatus to virtualize the file into dynamic chunks instead of fixed chunk sizes as is currently done in the distributed file systems today.

SUMMARY

A method and apparatus for achieving optimal use of compute, storage and network resources in a distributed computing environment like a big data analytics cluster is described. In one embodiment, a job is submitted. The job request is associated with an input file(s). The Job Scheduler in conjunction with a workflow manager determines the best fit for dynamically chunking size of the file(s). The distributed file (or object) storage system provides these dynamic views (file view in chunk size as above) to the compute resources where the job will be run. At the same time this beforehand knowledge is used to pre-staging the data by the distributed file (or object) storage system. Furthermore, keeping a history of job(s) and their data (file or chunks) allows for further improvements in resources and job execution times by being able to skip processing on data that has been done previously. Given the ability to chunk the file dynamically, it is possible to re-balance resources (CPU for example) for a running job dynamically, if it is not meeting its service level agreement (SLA).

In a first advantageous aspect, when scheduling a job (and the input files for that job), the file is dynamically chunked into a size that meets the need of the compute resources currently available; or meets a SLA for the user/job that was submitted. Given a pipeline of jobs, one can envision a scheduler that takes into account the compute, network and storage resources in order to provide an optimally balanced big data cluster. For example, the order of a set of jobs can be re-arranged in order to achieve maximum resource utilization.

In a second advantageous aspect, the aforementioned advanced knowledge of data chunks being used by jobs can be used to provide pre-staging (pre-fetching) of data by the distributed file (object) storage system. Pre-staging results in considerable speedup of jobs because data is being served out of memory (RAM) instead of hard disk drive or solid-state drive.

In a third advantageous aspect, the above techniques can be extended to make changes in resources dynamically while a job is running and result in speeding up a job which may be taking too long i.e. not meeting it's time completion SLA. It should be noted that depending on the phase of the job (whether it is in map, shuffle or reduce phase for example), adding or subtracting of compute, network or storage resource may or may not achieve the desired effect. One can envision a generic heuristic algorithm that determines if/how/when reallocation is performed.

In a fourth advantageous aspect, it is possible to record a history and resource utilized by each job during each run. This history can be used to make optimizations when the job is run again. A job may be considered a set of files and a set of operations done on the set of files. If a history is kept of the resources needed to run a job, it can be further extended to save the results of previous job runs. This technique can then be used to achieve further optimizations for a job. For example, if a job is run on a certain file daily, after the file is updated, the aforementioned method can be used to process only the incremental daily changes thus leading to faster job completions.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
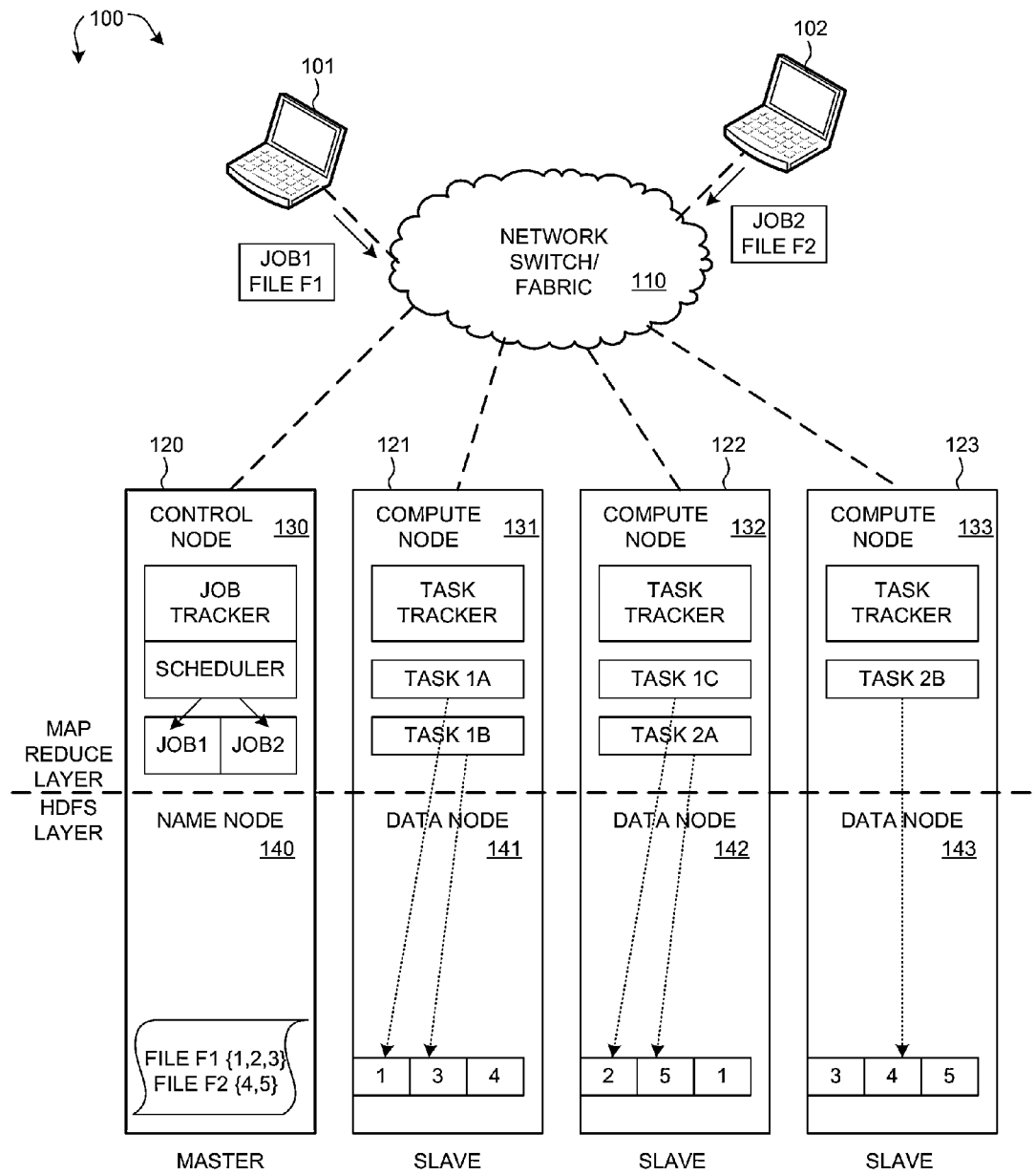
FIG. 1 (prior art) illustrates a typical Hadoop cluster environment with HDFS fixed sized chunking.
Figure 2A:
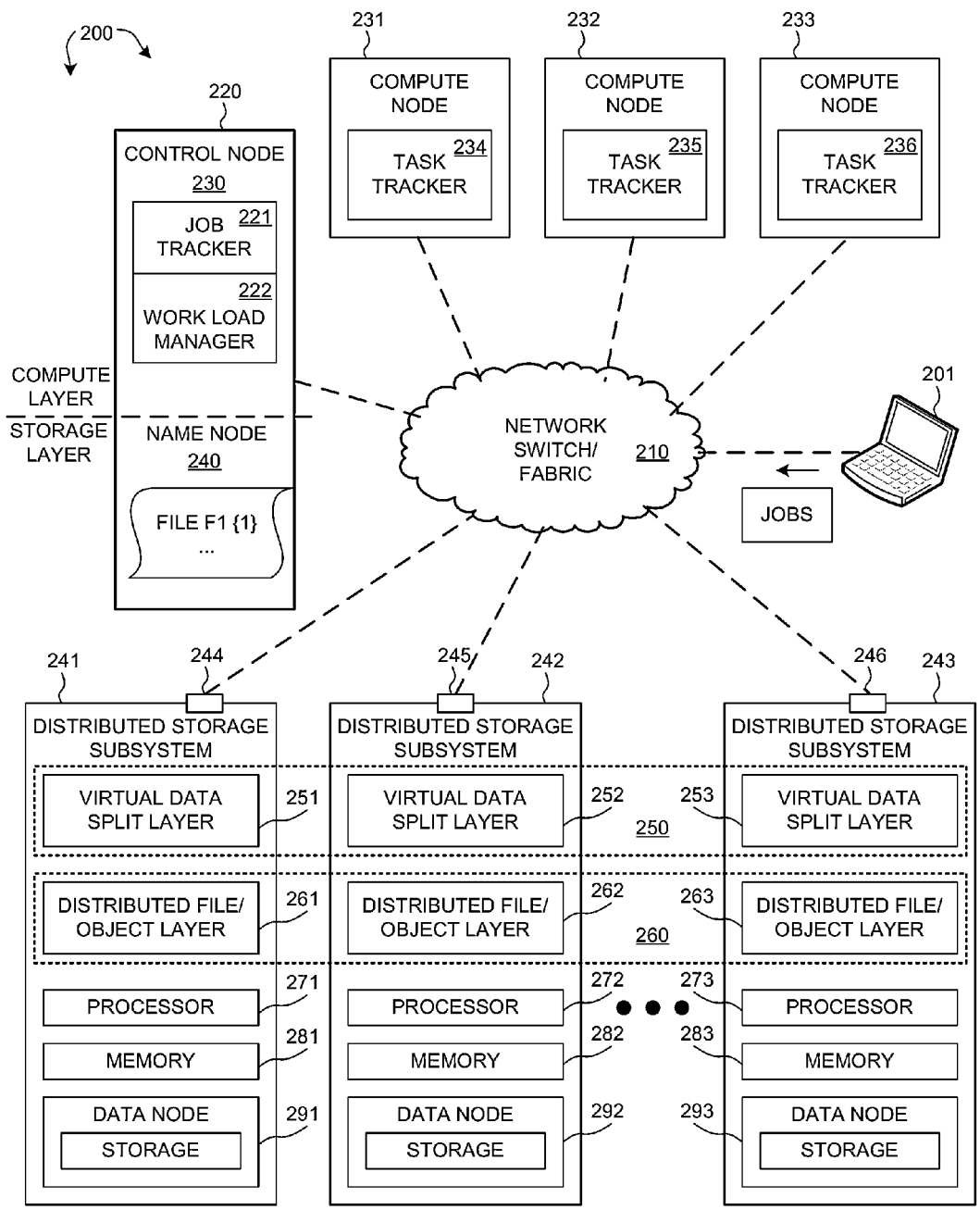
FIG. 2A illustrates a novel distributed computing system with dynamic sized chunking in accordance with one novel aspect.

FIG. 2A illustrates a novel distributed computing system 200 with dynamic sized chunking in accordance with one novel aspect. Distributed computing system 200 comprises a client terminal 201, a network switch/fabric 210, a master device 220 having a control node 230 and a name node 240, a plurality of compute nodes 231-233, and a plurality of distributed storage subsystems 241-243, each equipped with a data node having an amount of storage space. All the nodes/subsystems are connected via an Ethernet network by the network switch/fabric 210. The control node and the compute nodes form a MAP reduce compute layer, while the name node and the storage subsystems form a distributed file system storage layer. In this example, the compute layer and the storage layer are decoupled for ease of explanation. In another embodiment, a set of slave devices as shown in FIG. 1 may be employed for just compute purposes while others are used for only data storage. In yet another embodiment, the nodes comprising the compute and storage may be of different types. For example, the compute nodes may not house any disks at all, whereas the data nodes comprise a node with a lot of disks or solid-state devices or any combination. It can be seen that it is now possible to add compute and data nodes independently.

In the example of FIG. 2A, in the compute layer, control node 230 comprises a job tracker 221 that is responsible for scheduling and monitoring the jobs. Control node 230 also comprise a workload manager 222, which interfaces with job tracker 221 on scheduling jobs and with other compute nodes and data nodes. Workload manager 222 in turn comprises a job scheduler 223 for scheduling the jobs and a job executor 224 for executing the jobs. Compute nodes 231-233 comprise task trackers 234-236 for running tasks (part of a job) scheduled by the workload manager via scheduler 223. The task trackers work in conjunction with the job tracker 221, reporting task status as well as starting new tasks. In the storage layer, name node 240 presents the interface to client 201 for writing and reading data to/from the distributed storage subsystems as well as submitting jobs. For example, jobs are submitter from client terminal 201 to job tracker 221 and an input file F1 is stored onto the data nodes via name node 240.

Each distributed storage subsystem (241-243) comprises a list of components. For example, distributed storage subsystem 241 comprises a data node 291, memory 281, a processor 271, a distributed file/object layer 261, a virtual data split layer (VDSL) 251, and a network interface 244. Distributed subsystems 242 and 243 comprise similar components. The distributed file/object layers 261-263 together form a single distributed file/object layer 260, which are implemented in a combination of hardware circuitry firmware/software codes being executable by processors 271-273 to perform desired functions. Similarly, the virtual data split layers 251-253 together form a single virtual data split layer (VDSL) 250, which are implemented in a combination of hardware circuitry firmware/software codes being executable by processors 271-273 to perform desired functions. The storage spaces in data nodes 291-293 may be a type of hard disk drive or solid-state drive that has slow access speed, whereas the memory 281-283 may be a type of random access memory (RAM) that has much faster access speed.

Figure 2B:
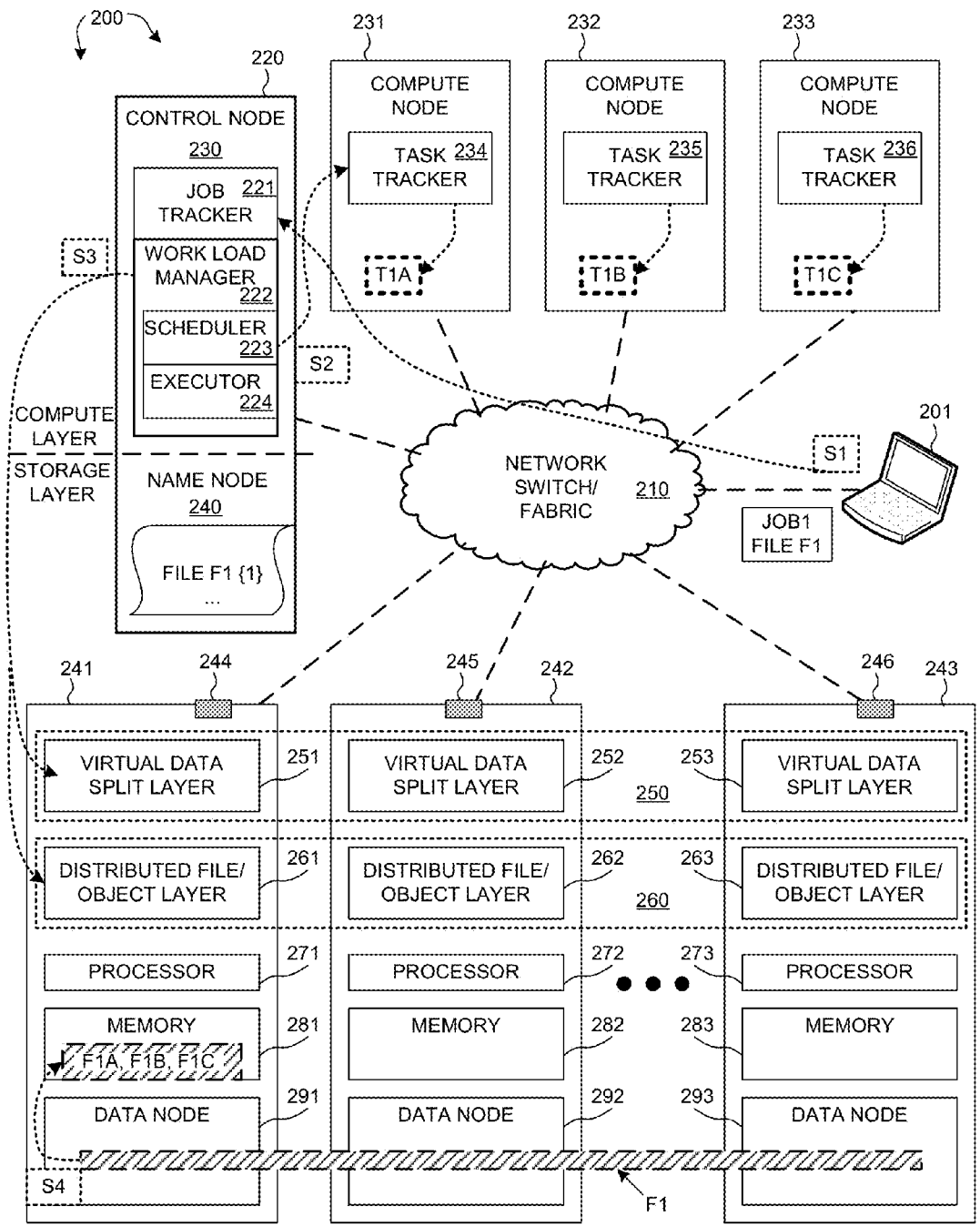
FIG. 2B illustrates one example of performing a job with dynamic sized chunking in a novel distributed computing system.

FIG. 2B illustrates one example of performing a job with dynamic sized chunking in a novel distributed computing system 200 of FIG. 2A. In step S1, client terminal 201 submits a job (JOB1), which runs on file F1. F1 consists of a single block of size 128 MB, which is shown as F1={1} in name node 240. F1 is stored across the data nodes of the distributed storage subsystems, as depicted by a rectangle box with slash shade. Job tracker 221 accepts JOB1, and passes to workload manager 222 for scheduling JOB1 via scheduler 223. The workload manager determines that three compute nodes (231-233) are currently available, and the input file F1 can be chunked into three parts. In step S2, scheduler 223 in conjunction with the job tracker schedules tasks T1A, T1B, and T1C to be run on compute nodes 231-233 respectively. In step S3, the workload manager, in conjunction with the distributed file/object layer 260, requests the VDSL 250 to chunk F1 into three parts F1A, F1B, and F1C. This is achieved without having to rewrite the original files again. After splitting F1, in step S4, VDSL 250 requests the data nodes to pre-stage the data from the storage space onto the memory. For example, VDSL 250 on each corresponding subsystems (e.g., 251-253) will read the data from the data nodes 291-293 and pre-stage them in their corresponding RAM memory 281-283. In one specific example, F1A, F1B, and F1C have been pre-staged onto RAM memory 281. In other examples, they could be pre-staged onto other nodes, e.g., F1B could be pre-staged onto RAM memory 282, and F1C be pre-stage onto RAM memory 283. Going back to step S2, scheduler 223 assigns F1A, F1B, and F1C to the respective compute nodes 231-233. The three chunks F1A, F1B, and F1C are then assigned to the respective compute nodes. For example, F1A is assigned to task T1A on compute node 231, F1B is assigned to task T1B on compute node 232, and F1C is assigned to task T1C on compute node 233. In effect, by the time the job executor 224 starts to execute JOB1 and associated tasks T1A, T1B, and T1C to be running on the compute nodes, the data has already been pre-staged by the data nodes for faster data access from the RAM.

Figure 2C:
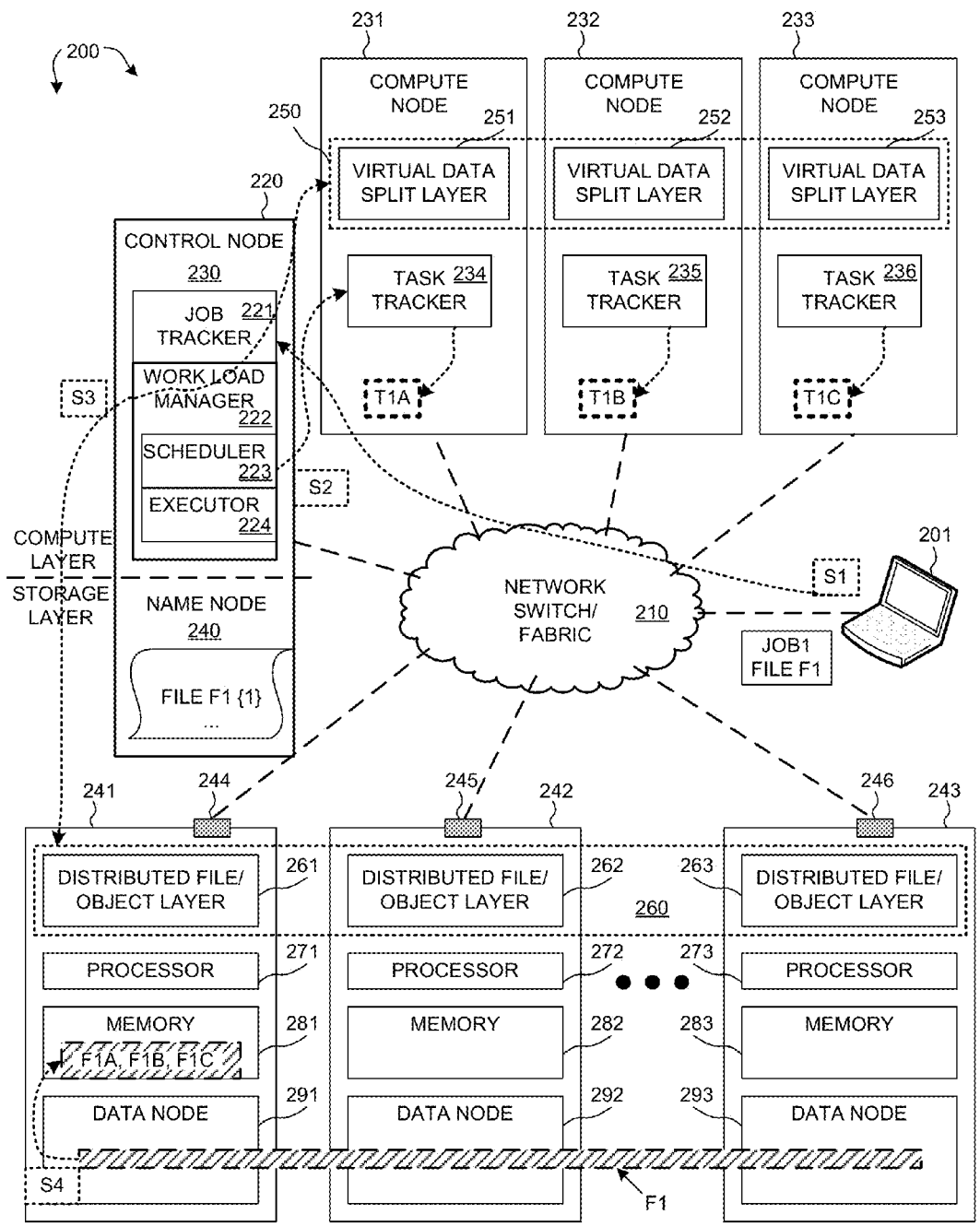
FIG. 2C illustrates an alternative architecture of a novel distributed computing system with dynamic sized chunking in accordance with one novel aspect.

FIG. 2C illustrates an alternative architecture of the novel distributed computing system 200 with dynamic sized chunking. In the example of FIG. 2C, the virtual data split layer 250 is implemented on the compute nodes 231-233. In this scenario, the distributed file/Object storage sub-system can be any 3$^{rd}$ party storage products. Furthermore, they can be accessed from the compute nodes via standard SAN (Storage Area Networks), or NAS (network-attached storage) protocols. Additionally, in this scenario one can make any data (residing in any storage sub-system) available for analytics (via map-reduce) without having to transfer the data (from the storage sub-system) into the distributed compute system (i.e., Hadoop) first. This results in substantial time and resource savings.

Figure 3:
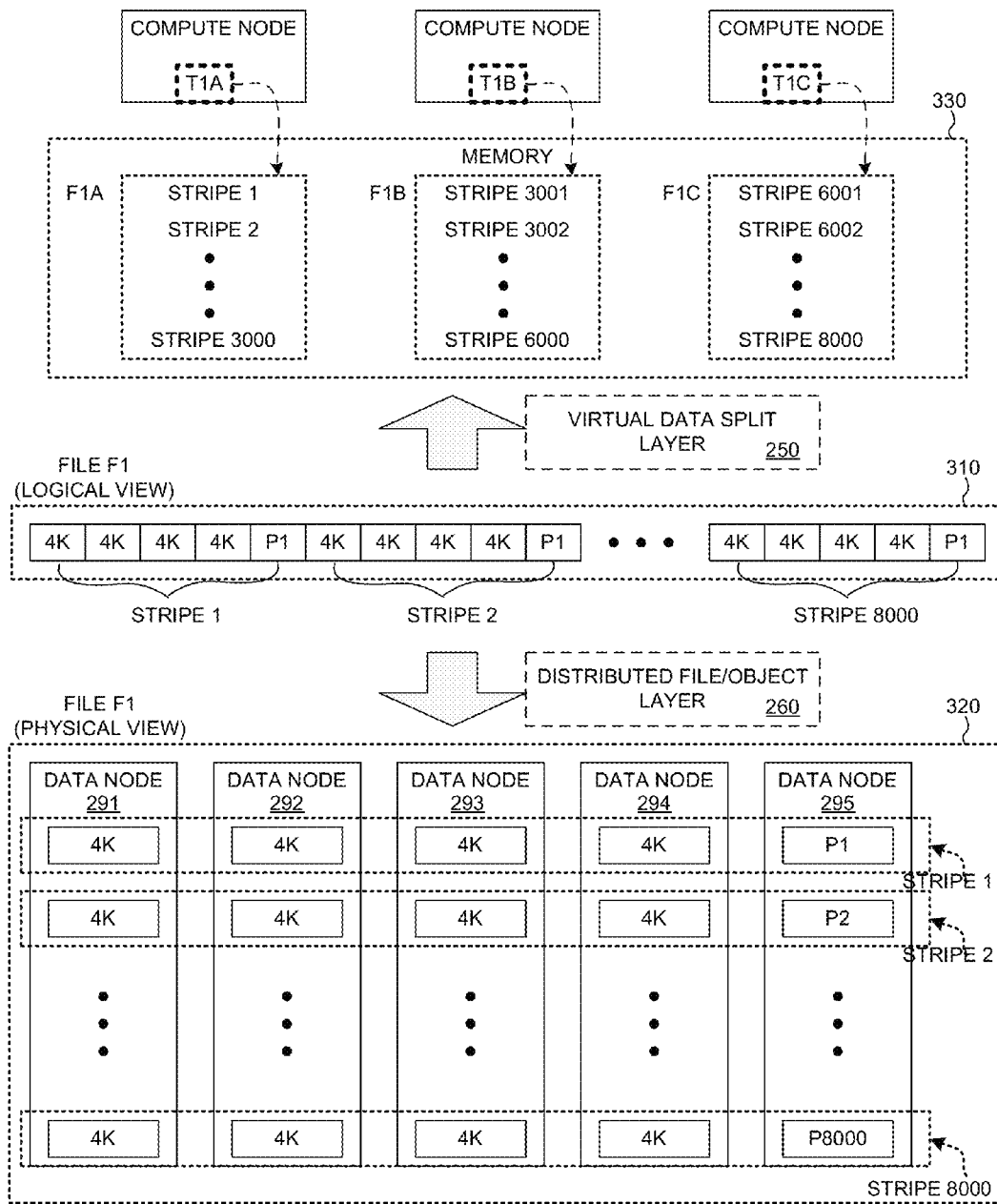
FIG. 3 illustrates one example of storing, splitting and pre-staging an input file in accordance with one novel aspect.

FIG. 3 illustrates one example of storing, splitting and pre-staging an input file F1 in distributed computing system 200 in accordance with one novel aspect. In the example of FIG. 3, input file F1 is first physically stored in the data nodes of the distributed storage subsystems. In this example, there are five data nodes 291-295, together form a storage space for RAID5 protection (4+1P, 4 data with 1 parity protection). Box 310 shows a logical view of F1, which consists of 128 MB of data. The 128 MB is logically distributed into 4 KB blocks. The block size (the smallest division) is 4 KB, but may have a range from 512 B to 8 KB. As depicted by box 300, every four 4 KB data plus one 4 KB parity together form a stripe. As a result, F1 consists of 8000 stripes for the 128 MB data. The distributed file/object layer 260 then stores the 8000 stripes across the data nodes 291-295 under RAID5 protection. Box 320 depicts a physical view of input file F1, which is stored across the data nodes 291-295 in the form of 8000 stripes.

Later, the virtual data split layer (VDSL) 250 receives a request from the workload manager to split F1 into three chunks. VDSL 250 then presents the data chunks to the workload manager/scheduler, so that the data chunks can be assigned to the respective compute nodes. VDSL 250 could split F1 in various fashions. For example, one way is to split F1 into three chunks F1A, F1B, and F1C containing different stripes: F1A contains stripes 1-3000 and assigned to compute node 231, F1B contains stripes 3001-6000 and assigned to compute node 232, and F1C contains stripes 6001-8000 and assigned to compute node 233. In addition, VDSL 250, in conjunction with distributed file/object layer 260, also requests the data nodes to pre-stage the chunked data. As depicted by box 330, the chunked data F1A, F1B, and F1C are copied from the data nodes onto the memory. By the time the computed nodes start to run tasks T1A, T1B, and T1C, the assigned corresponding data chunks F1A, F1B, and F1C have already been pre-staged for fast access.

Based on the above-illustrated example, the distributed file/object layer is responsible for physically storing the files across a plurality of data nodes in small data blocks (e.g., 512 B to 8 KB) using some kind of RAID protection. Note that the block size is substantially smaller than the file size (e.g., 128 MB). On the other hand, the virtual data split layer (VDSL) is responsible for splitting the files and presenting the compute nodes with a dynamic chunk size of files as determined by the workload manager. In a first advantageous aspect, when scheduling a job (and the input files for that job), the file is dynamically chunked into a size that meets the need of the compute resources currently available; or meets a SLA for the user/job that was submitted. In a second advantageous aspect, the advanced knowledge of data chunks being used by jobs can be used to provide pre-staging (pre-fetching) of data for speeding up jobs because data is being served out of memory (RAM) instead of hard disk drives or solid-state drives.

In a third advantageous aspect, it is possible to record a history and resource utilized by each job during each run.

This history can be used to make optimizations when the job is run again. A job may be considered a set of files and a set of operations done on the set of files. If a history is kept of the resources needed to run a job, it can be further extended to save the results of previous job runs. This technique (job de-duplication) can then be used to achieve further optimizations for a job. For example, if a job is run on a certain file daily, after the file is updated, the method of job de-duplication can be used to process only the incremental daily changes thus leading to faster job completions.

Figure 4:
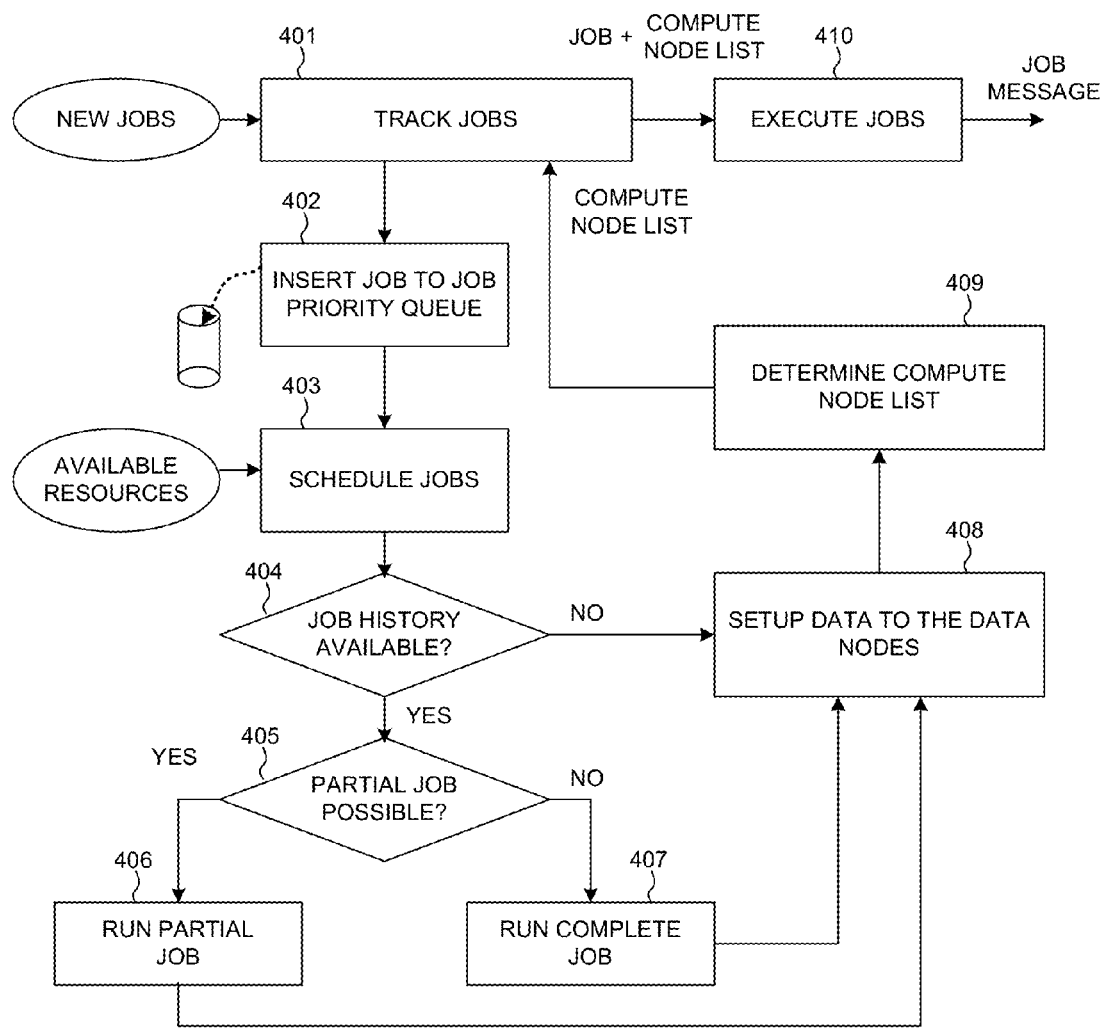
FIG. 4 is a flow chart of a workload manager on performing a job with job de-duplication.

FIG. 4 is a flow chart of a workload manager on performing a job with job de-duplication. In step 401, a job tracker accepts a newly submitted job. The job tracker is responsible for tracking, scheduling, and monitoring the execution of the job via a workload manager. The new job is then inserted in to a job priority queue in step 402. Different jobs may have different priorities, e.g., based on their SLA. In step 403, a scheduler of the workload manager picks the job from the job priority queue and goes through the logic steps of matching the resources available, SLA, job history, etc. in order to produce an execution plan for the job. In step 404, the workload manager checks whether job history is available. If the answer is NO, then the scheduler setup data to the data nodes in step 408. As previously explained, the workload manager determines the pre-data staging and dynamic chunk size information and conveys the information to the data nodes for pre-staging the data via a virtual data split layer in a distributed storage subsystem. In step 409, the workload manager determines a list of the compute nodes that are going to performing the job, and send the list to the job tracker. Finally, in step 410, the job tracker sends the job and the compute node list to a job executor, which sends a job message to all compute nodes in the list. The job executor executes the job by scheduling different tasks to be run on each compute node. The different tasks work in conjunction with the job tracker, reporting task status until the job is completed.

On the other hand, if the job has a history determined by step 404, then an execution plan is generated to bypass the piece(s) of the job that have already been run before. The workload manager first goes to step 405 to check whether it is possible to run partial job based on the job history. If the answer is yes, then the workload manager prepares data for running a partial job in step 406. If the answer is no, then the workload manager prepares data for running a complete job in step 407. The workload manager then goes to step 408 and follows the same steps 409 and 410 to complete the job execution plan. This technique of job de-duplication can be done in various ways and explained below.

Figure 5:
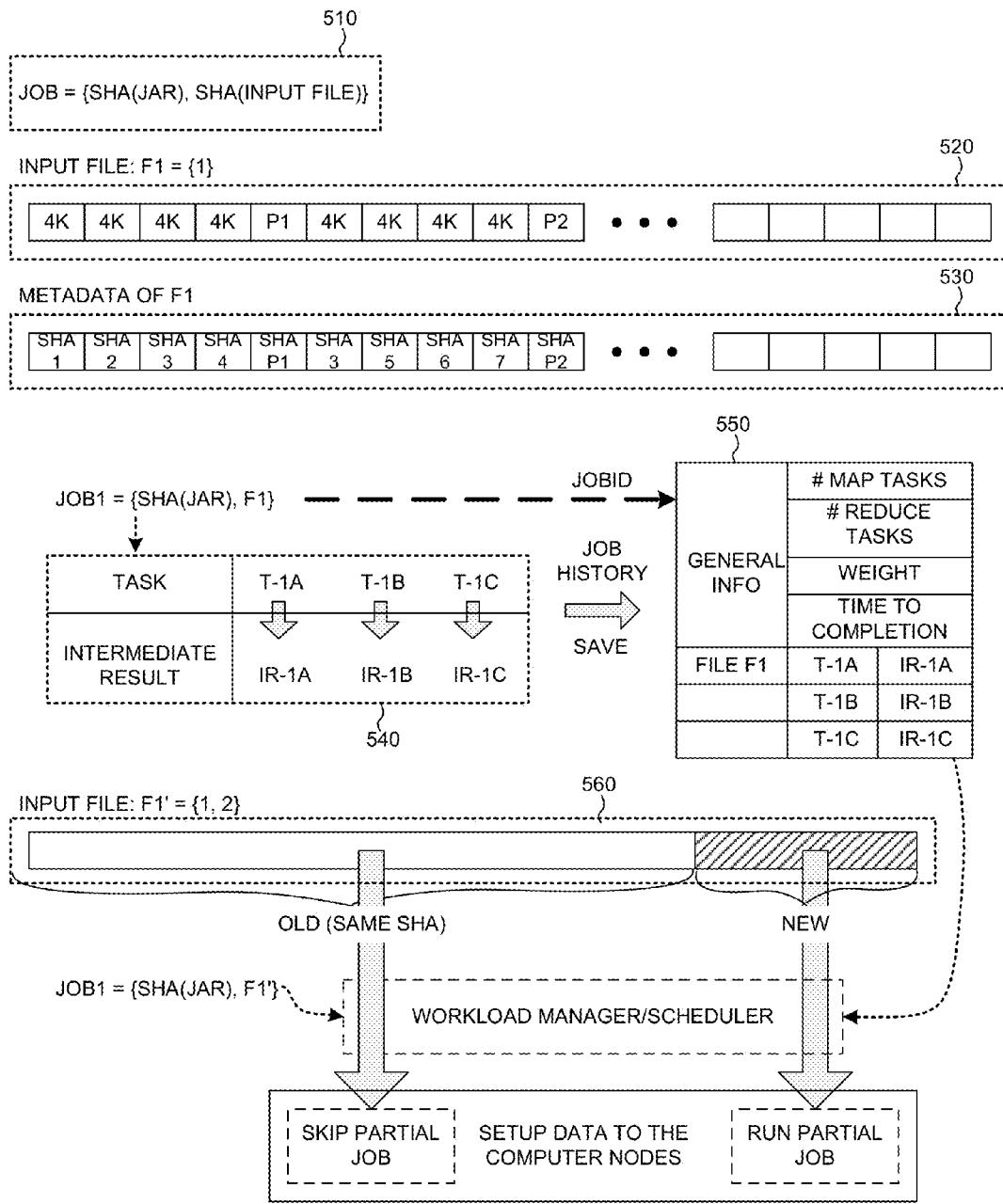
FIG. 5 illustrates one example of job de-duplication using fingerprints.

FIG. 5 illustrates one example of job de-duplication using fingerprints. A job may be considered a set of files and a set of operations done on the set of files. If a history is kept of the resources needed to run a job, it can further be extended to save the results of previous job runs. Keeping a history of job(s) and their data (file or chunks) allows for further improvements in resources and job execution time by being able to skip processing on data that has been done previously. This technique is called job de-duplication. In one embodiment, a fingerprint of each chunk of a file is matched with the fingerprint of the job. Any general method of fingerprinting can be employed for generating the fingerprints. The different fingerprinting methods include but are not limited to SHA-1 (20 bytes), SHA-2 (40 bytes), or SHA-3 (60 bytes) techniques.

In the example of FIG. 5, each job is represented by JOB={SHA(JAR), SHA(INPUT FILE)} as depicted by box 510. For each input file, the fingerprinting can be generated on a whole file or can be generated to multiple chunks comprising the file. Take input file F1 as an example, box 520 depicts the logical view of F1, while box 530 depicts the fingerprints of F1, which are generated to every 4 KB chunks of data. This information can be stored in a separate database, so that it can be looked up by the job scheduler. Alternatively, the relationship between fingerprints of file chunks and job is stored as a metadata of the file itself.

Now consider a specific job JOB1 that is run on file F1 daily. For example, JOB1={SHA(JAR), F1}, and F1={1}. JOB1 is scheduled and executed by three different tasks T1A, T1B, and T1C. As depicted by box 540, each task has produced certain intermediate results, marked as IR-1A, IR-1B, and IR-1C. The job history is then saved in the file metadata, or a separate database, or a table with indices. As depicted by table 550, the job history is indexed by a JOBID, and contains general information such as number of map tasks, number of reduce tasks, Weight of each stage (M1, M2 & R1, R2, R3), Time to completion, etc. In addition, the job history contains the intermediate result for each input file executed by each task. For example, after the first run, the intermediate results IR-1A, IR-1B, and IR-1C from tasks T1A, T1B, and T1C are saved in the job history.

Next, the same job JOB1 is run on file F1 again. For example, file F1 is appended or updated every day with incremental changes. We can denote JOB1={SHA(JAR), F1'}, and F1'={1, 2}. As depicted by box 560, the fingerprints of input file F1' contains two parts, a first part containing OLD data, which has the exact same SHA as file F1, and a second part of NEW data, which has different SHA as compared to F1. When JOB1 is scheduled again, the workload manager/scheduler first checks whether job history is available for JOB1. Based on the same fingerprint of the job, and the same fingerprints of part of the input file, a match is found for JOB1 and F1. The scheduler then looks up the results of the previous run(s) from the job history (e.g., table 550). It is then possible for the scheduler to skip partial job that has already been run on the OLD data, and only schedule to run partial job that has not been run on the NEW data. Using the job de-duplication technique, the jobs run only on incremental data every day after the first run and thereby achieving considerable resource savings.

In a fourth advantageous aspect, the above techniques can be extended to make changes in resources dynamically while a job is running and result in speeding up a job which may be taking too long i.e. not meeting it's time completion SLA. It should be noted that depending on the phase of the job (whether it is in map, shuffle or reduce phase for example), adding or subtracting of compute, network or storage resource may or may not achieve the desired effect. One can envision a generic heuristic algorithm that determines if/how/when reallocation is performed.

Figure 6:
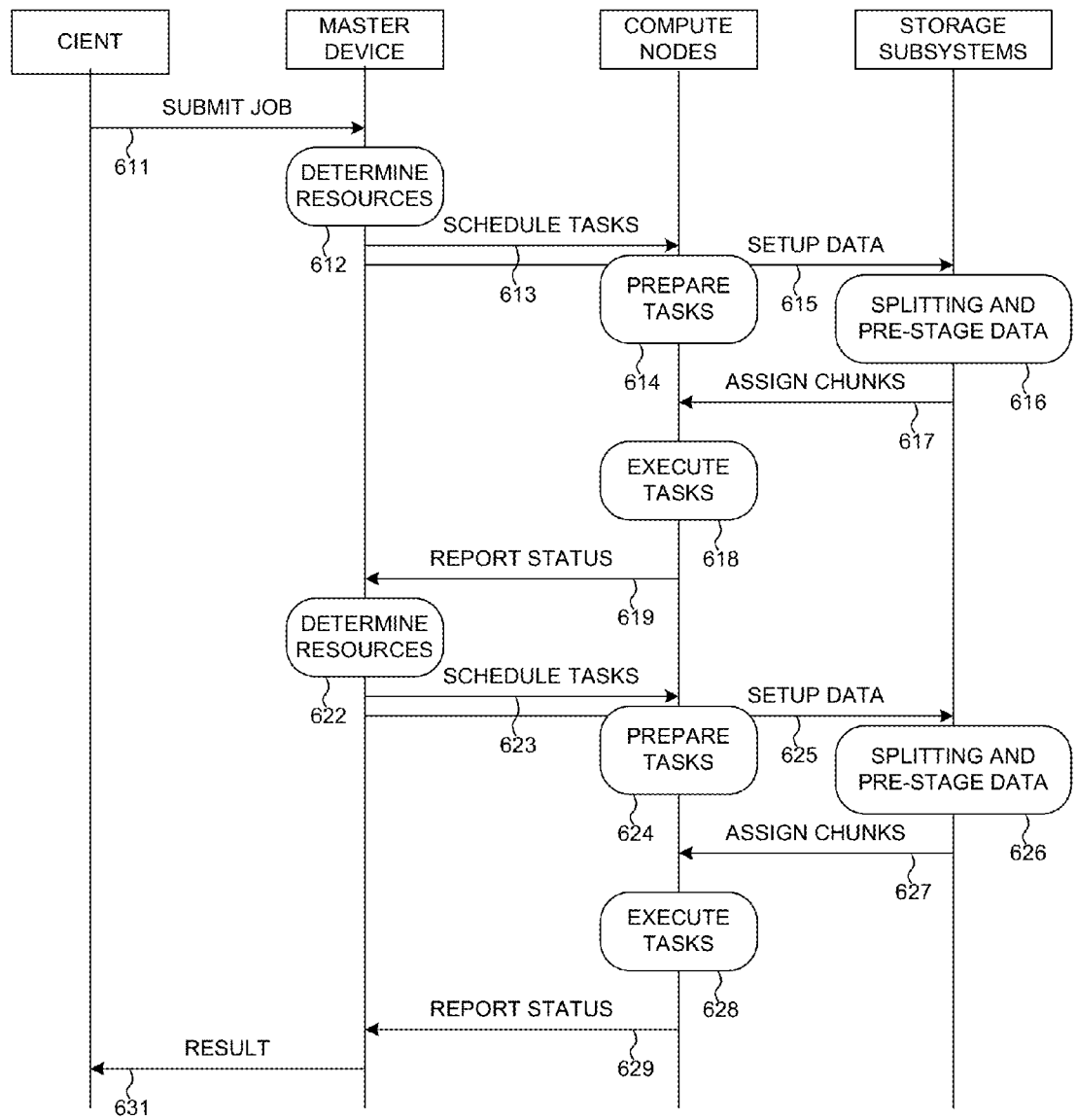
FIG. 6 illustrates one embodiment of dynamic changing resources while a job is running in a novel distributed computing system.

FIG. 6 illustrates one embodiment of dynamic changing resources while a job is running in a novel distributed computing system. In step 611, a client submits a job associate with an input file to a job tracker on a master device. In step 612, a workload manager on the master device determines pre-data staging and dynamic chunk size information, and a scheduler schedules different tasks to be run on a list of compute nodes. The number of chunks is dynamically determined based on available CPU and/or RAM resources. In step 613, the scheduler sends the scheduling information to the list of compute nodes. In step 614, the list of compute nodes start preparing the tasks. In step 615, the workload manager conveys the dynamic chunk size information to the data nodes on a list of distributed storage subsystems. In step 616, a virtual data split layer on the distributed storage subsystem for splitting the file into data chunks and pre-staging the data without having to rewrite the file. In step 617, the storage subsystems assign the data chunks to corresponding compute nodes. In step 618, the compute nodes executes the tasks with fast access because the data chunks have already been pre-staged from hard disk drive or solid-state disk drive to memory (RAM). In step 619, the compute nodes report task status to the job tracker.

Based on the status of the job, the workload manager may dynamically change resources while the job is running. For example, if the job is running too slow, i.e., not meeting the time completion SLA, then the workload manager may determine to add more compute nodes in performing the job. In one example, an original job JOB1 involves three compute nodes running three tasks T1A, T1B and T1C on three chunks F1A, F1B and F1C of an input file F1 respectively. However, the tasks status shows that the job is running too slow to meet its SLA. If three additional compute nodes become available, then the workload manager may terminate the slowest running task T1C, further split chunk F1C to three sub-chunks F1C1, F1C2, and F1C3, and assign them to be run on the three additional compute nodes. In a similar example for JOB1, at the start of JOB1, only two compute nodes could be assigned to the job (e.g., one compute node is offline). At the time while tasks T1A and T1B is running on F1A and F1B, three more compute nodes become available. Consequently, the workload manager determines to further split chunk F1C to three sub-chunks F1C1, F1C2, and F1C3, and assign them to the three newly available compute nodes. Upon determine the resources, steps 622 to 629 are repeated the same way as steps 612 to 619. Finally, in step 631, the job is completed, and the result is send back to the client.

Figure 7:
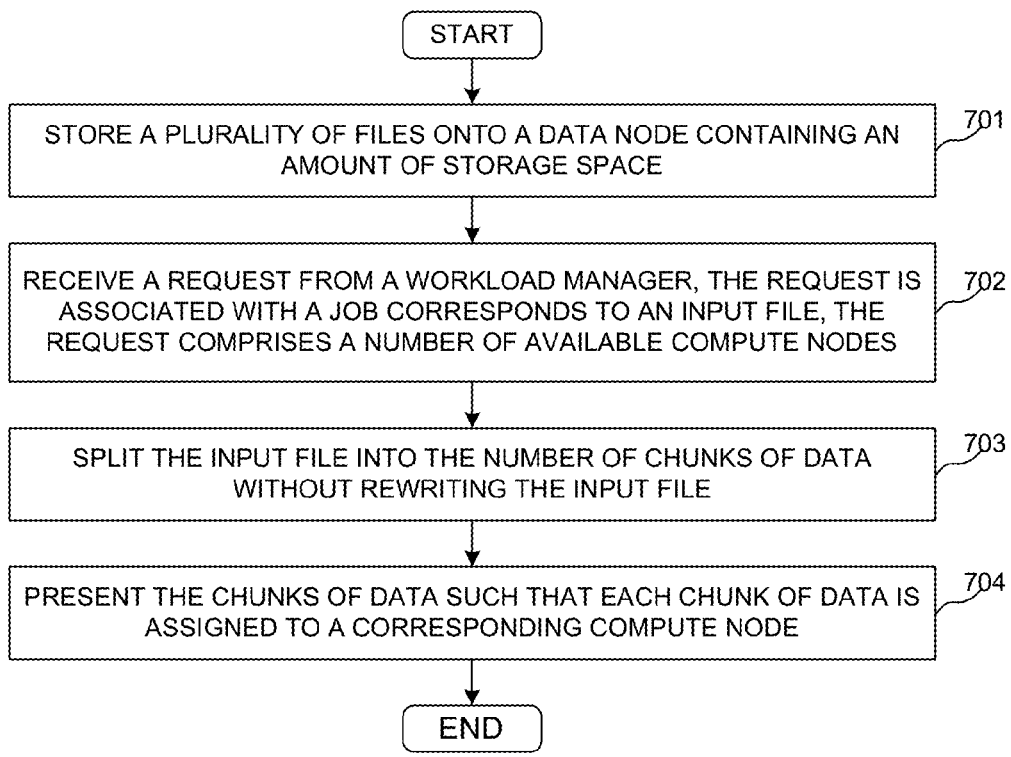
FIG. 7 is a flow chart of a method of dynamic sized chunking form storage subsystem perspective in a novel distributed computing system.

FIG. 7 is a flow chart of a method of dynamic sized chunking form storage subsystem perspective in a novel distributed computing system. In step 701, a distributed storage subsystem stores a plurality of files onto an amount of storage space of a data node. In step 702, the storage subsystem receives a request from a workload manager. The request is associated with a job corresponds to an input file. The request comprises a number of available compute nodes in a distributed computing system for performing the job. In step 703, the storage subsystem splits the input file into the number of dynamically determined chunks of data without rewriting the input file. In step 704, the storage subsystem presents the chunks of data to the workload manager such that each chunk of data is assigned to a corresponding compute node for performing the job.

Figure 8:
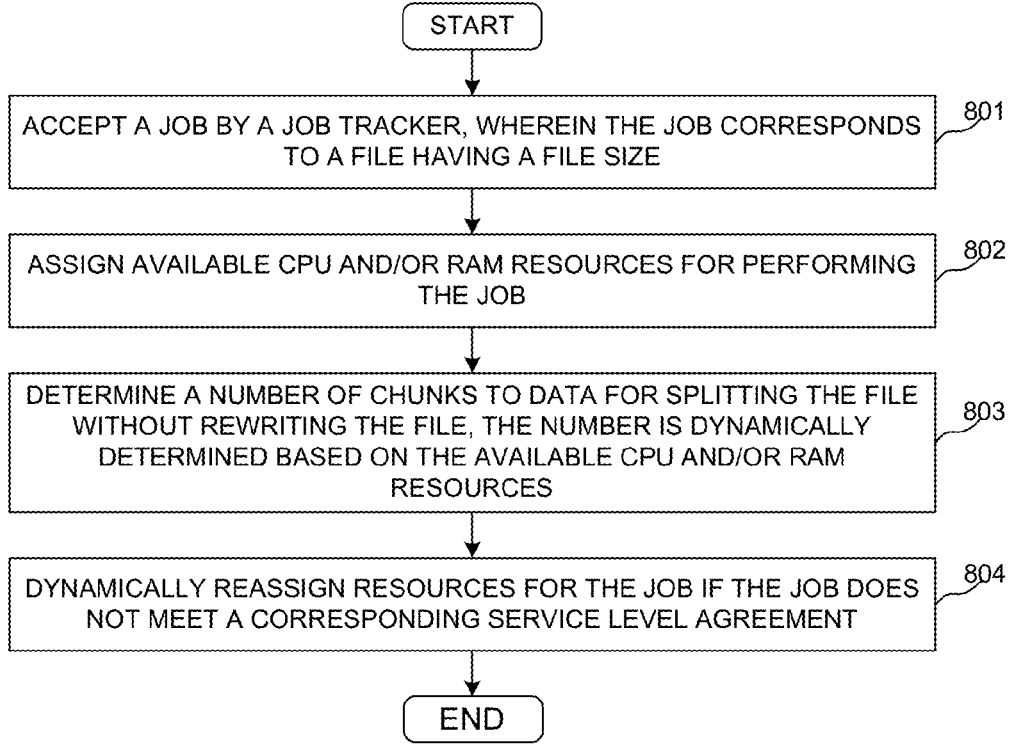
FIG. 8 is a flow chart of a method of dynamic sized chunking from workload manager perspective in a novel distributed computing system.

FIG. 8 is a flow chart of a method of dynamic sized chunking from workload manager perspective in a novel distributed computing system. In step 801, a job tracker on a master device accepts a job that corresponds to an input file having a file size. In step 802, a workload manager on the master device assigns available CPU and/or RAM resources for performing the jobs. In step 803, the workload manager determines a number of chunks of data for splitting the input file without rewriting the file. The number is dynamically determined based on the available CPU and/or RAM resources. In step 804, the workload manager dynamically reassigns resources for the job if the job does not meet a corresponding SLA.

In one or more exemplary embodiments, the functions described above may be implemented in hardware, software, firmware, or any combination thereof. If implemented in software, the functions may be stored on or transmitted over as one or more instructions or code on a computer-readable (processor-readable) medium. Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that both can be used to carry or store desired program code in the form of instructions or data structures, and can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blue-ray disc where disks usually reproduce data magnetically, while discs reproduce data optically with lasers. Combinations of the above should also be included within the scope of computer-readable media.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A distributed storage subsystem, comprising:
    a data node containing an amount of storage space for storing a plurality of files;
    a network interface that receives a request, wherein the request is associated with a job corresponds to an operation on an input file, and wherein the request comprises information on a number of available compute nodes in a distributed computing system for performing a number of tasks of the job; and
    a virtual data split layer (VDSL) that splits the input file into a first number of chunks of data without rewriting the input file, wherein each chunk of data is assigned to a corresponding compute node for performing a corresponding task, and wherein a job history with task IDs and task history with intermediate task results are stored using fingerprints for job de-duplication of skipping the operation on data chunks that have been done previously by matching fingerprints of the number of tasks of the job and fingerprints of the tasks history.

2. The subsystem of claim 1, further comprising:
    a memory space, wherein the data node pre-stages the chunks of data from the storage space onto the memory space such that the chunks of data are accessible by the compute nodes directly from the memory space.

3. The subsystem of claim 2, wherein the storage space has a slower access speed, and wherein the memory space has a faster access speed.

4. The subsystem of claim 1, wherein the network interface receives a second request associated with the same job, wherein the second request comprises information on a second number of available compute nodes, and wherein the VDSL splits one or more chunks into a second number of sub-chunks of data based on the second number of available compute nodes without rewriting the input file.

5. The subsystem of claim 1, further comprising:
a distributed file/object system that divides the input file into blocks to be stored in a redundant array of independent disks (RAID) of the storage space, wherein the block size is substantially smaller than the file size of the input file.

6. The subsystem of claim 5, wherein each chunk of data contains different blocks of the input file to be assigned to the corresponding compute nodes.

7. The subsystem of claim 1, wherein the job history and associated data are stored using fingerprints including at least one of SHA-1, SHA-2, or SHA-3 cryptographic hash functions.

8. A method, comprising:
receiving a request by a virtual data split layer in a distributed computing system, wherein the request is associated with a job corresponds to an operation on an input file, and wherein the request comprises information on a number of available compute nodes for performing a number of tasks of the job;
splitting the input file into a first number of chunks of data without rewriting the input file, wherein the input file is stored in an amount of storage space; and
presenting the chunks of data such that each chunk of data is assigned to a corresponding compute node for performing a corresponding task, wherein a job history with task IDs and tasks history with intermediate task results are stored using fingerprints for job de-duplication of skipping the operation on data chunks that have been done previously by matching fingerprints of the number of tasks of the job and fingerprints of the tasks history.

9. The method of claim 8, further comprising:
pre-staging the chunks of data from the storage space onto a memory space such that the chunks of data are accessible by the compute nodes directly from the memory space.

10. The method of claim 9, wherein the storage space has a slower access speed, and wherein the memory space has a faster access speed.

11. The method of claim 8, further comprising:
receiving a second request associated with the same job, wherein the second request comprises information on a second number of available compute nodes; and
splitting one or more chunks into a second number of sub-chunks of data based on the second number of available compute nodes without rewriting the input file.

12. The method of claim 8, wherein the input file is divided into blocks and stored in a redundant array of independent disks (RAID) of the storage space, and wherein the block size is substantially smaller than the file size.

13. The method of claim 12, wherein each chunk of data contains different blocks of the input file to be assigned to the corresponding compute nodes.

14. The method of claim 8, wherein the job history and associated data are stored using fingerprints including at least one of SHA-1, SHA-2, or SHA-3 cryptographic hash functions.

15. The method of claim 8, further comprising:
storing a plurality of files onto a plurality of data nodes containing the amount of storage space, wherein the virtual data split layer resides together with the data nodes.

16. The method of claim 8, wherein the virtual data split layer resides in one or more compute nodes in the distributed computing system.

17. A method, comprising:
accepting a job, wherein the job corresponds to an operation on a file having a file size;
assigning available CPU and/or RAM resources for performing a number of tasks of the job;
determining a number of chunks of data for splitting the file without rewriting the file, wherein the number of chunks is dynamically determined based on the available CPU and/or RAM resources;
recording a job history with task IDs and tasks history with intermediate task results and associated data using fingerprints for job de-duplication, wherein the job deduplication involves skipping the operation on chunks that have been done previously by comparing fingerprints of the number of tasks of the job and fingerprints of the tasks history; and
dynamically re-assigning resources while the job is running if the job does not meet a corresponding service level agreement.

18. The method of claim 17, wherein the number of chunks of data is pre-staged onto a number of data nodes via communication between the workload manager and a distributed storage subsystem.

19. The method of claim 17, further comprising:
determining whether the job has been run before by matching the fingerprints of the job with job history; and
skip running the job or a part of the job that has been performed already if a match is found.

20. The method of claim 17, wherein the re-assigning resources involves adding or subtracting computing and/or storage resources.

21. The method of claim 17, further comprising:
inserting the job into a job priority queue with a priority based on the corresponding service level agreement; and
scheduling the job for execution based on the priority.

* * * * *